United States Patent
Beierl et al.

(10) Patent No.: US 7,607,715 B2
(45) Date of Patent: Oct. 27, 2009

(54) FLEXIBLE VEHICLE ROOF

(75) Inventors: Dominik Beierl, Korntal-Münchingen (DE); Wolfgang Braun, Albershausen (DE); Felix Hermann, Leonberg (DE); Lars Schulz, Schöneiche (DE)

(73) Assignee: Dr. Ing. h.c. F. Porsche Aktiengesellschaft, Weissach (DE)

( * ) Notice: Subject to any disclaimer, the term of this patent is extended or adjusted under 35 U.S.C. 154(b) by 51 days.

(21) Appl. No.: 11/852,490

(22) Filed: Sep. 10, 2007

(65) Prior Publication Data
US 2008/0061587 A1    Mar. 13, 2008

(30) Foreign Application Priority Data
Sep. 8, 2006    (DE) .................. 10 2006 042 295

(51) Int. Cl.
*B60J 7/14*    (2006.01)
(52) U.S. Cl. .................. 296/108; 296/107.15
(58) Field of Classification Search .................. 296/108, 296/107.15
See application file for complete search history.

(56) References Cited

U.S. PATENT DOCUMENTS

| | | | |
|---|---|---|---|
| 2,704,225 A * | 3/1955 | Anschuetz et al. | .......... 296/108 |
| 6,796,597 B2 | 9/2004 | MacFarland | |
| 6,857,687 B2 * | 2/2005 | Bruder | .......... 296/108 |
| 7,377,574 B2 * | 5/2008 | Richter et al. | .......... 296/107.15 |
| 2007/0200386 A1 * | 8/2007 | Halbweiss et al. | .......... 296/108 |

FOREIGN PATENT DOCUMENTS

| | | |
|---|---|---|
| DE | 10119069 C5 | 9/2005 |
| EP | 1331122 B1 | 7/2003 |

* cited by examiner

*Primary Examiner*—Dennis H Pedder

(57) ABSTRACT

A flexible vehicle roof has a flexible roof skin and a plurality of supporting elements that interact with the roof skin. The supporting elements are configured at least partially in some regions as sheet-like surface elements that support the roof skin. The supporting elements can be shifted together with the roof skin from a closed position into an open position opening up the vehicle interior, with it being possible for a plurality of the surface elements to be brought into overlap at least in some regions. In the open position, a front surface element forming the roof lug is disposed above a rear element surrounding a rear window, and a third surface element which, in the closed position, is disposed between the front and the rear elements can be displaced during the opening phase in a positively coupled manner into a packing position located below the rear element.

12 Claims, 4 Drawing Sheets

FLEXIBLE VEHICLE ROOF

CROSS-REFERENCE TO RELATED APPLICATION

This application claims the priority, under 35 U.S.C. § 119, of German application DE 10 2006 042 295.3, filed Sep. 8, 2006; the prior application is herewith incorporated by reference in its entirety.

BACKGROUND OF THE INVENTION

FIELD OF THE INVENTION

The invention relates to a flexible vehicle roof. In particular, it has a flexible roof skin and a plurality of supporting elements which interact with the latter and are configured at least partially in some regions as sheet-like surface elements which support the roof skin, and can be shifted together with the roof skin from a closed position into an open position opening up a vehicle interior. In this case, a plurality of the surface elements is brought into overlap at least in some regions.

German patent DE 101 19 069 discloses a collapsible top for a convertible, which contains three rigid roof parts, the front most roof part being shifted linearly under the second adjoining roof part, and these two roof parts in turn being shifted linearly under the third roof part. Finally, the assembly containing the three roof parts is lowered into the storage space of the top.

However, a folding-in mechanism of this type is not suitable for a roof covered with a flexible roof skin, since, because of the shifting of the front roof part under the roof part situated behind it, the top fabric would be able to be connected only with a high structural outlay, if at all.

Published, European patent EP 1 331 122 A1, corresponding to U.S. Pat. No. 6,796,597, discloses a retractable hard top which contains three roof sections or shells, with the two front sections being lowered to the rear and downward simultaneously with the rear third section. In this case, the front section is initially moved above the lowering second section and is subsequently moved between the latter and the third section. The third roof element is pivoted on the main bearing via a pivot point in such a manner that the upper sides of the roof parts subsequently point downward.

In comparison to the above-mentioned, two-part hard top, this three-part hard top already affords a significant improvement in the level of comfort and the size of the passenger cell, and the three-part hard top can also be provided with a textile top, but it has a high overall weight, since the third roof part, which accommodates the rear window, acts as a C pillar and is manufactured from solid material. It is disadvantageous, in particular, that, because of the sequence of movement of a roof with three large roof shells moved in a rotatary manner, the volume traversed by the roof parts during their rotational movement is greater than with only four smaller roof shells or a linear movement. Since, however, the roof parts absolutely have to be put away within a casing volume permitted by the textile fabric of the top, as small a movement volume as possible is basically to be sought. In particular, the rotational movement of the roof parts about the pivot point of the main bearing is also disadvantageous, since such a rotation of the three roof parts involves a high degree of loading of the pivot point and the latter therefore has to be configured in a correspondingly reinforced manner. In addition, a sufficient amount of free space has to be provided, so that, in particular, the rotational movement of the third roof part can be executed. Furthermore, the extensive sequence of movement of the three roof parts requires a correspondingly large amount of time in order to bring the roof into its lowered position. Since, in the lowered position, the lower side of the second roof part points upward, a large top compartment lid is required in order to prevent soiling of the lower side of the second roof part.

BRIEF SUMMARY OF THE INVENTION

It is accordingly an object of the invention to provide a flexible vehicle roof which overcomes the above-mentioned disadvantages of the prior art devices of this general type, which contains both a flexible roof skin and at least two sheet-like supporting elements, in such a manner that a light and at the same time stable, flexible vehicle roof is provided. Furthermore, it is the object of the invention to configure the flexible vehicle roof in such a manner that the shifting from the open position into the closed position and vice-versa requires only a small amount of time and, in particular, an attractive outer contour is ensured by the sheet-like supporting elements when the roof is closed.

With the foregoing and other objects in view there is provided, in accordance with the invention, a flexible vehicle roof. The roof contains a flexible roof skin and a plurality of supporting elements interacting with and supporting the flexible roof skin. The supporting elements are configured at least partially in some regions as sheet-like surface elements. The supporting elements are shifted together with the flexible roof skin from a closed position into an open position opening up a vehicle interior, it being possible for a plurality of the sheet-like surface elements to be brought into overlap at least in some regions. The supporting elements include a front surface element forming a roof lug, a rear element surrounding a rear window, and an intermediate surface element. In the open position, the front surface element is disposed above the rear element, and the intermediate surface element which, in the closed position, is disposed between the front surface element and the rear element can be displaced during an opening phase in a positively coupled manner into a packing position disposed below the rear element.

One of the core features of the invention is considered to be that, in the open position, a front surface element forming the roof lug is disposed above a rear element surrounding a rear window, and a third surface element which, in the closed position, is disposed between the front and the rear element can be displaced during the opening phase in a positively coupled manner into a packing position located below the fourth element. By dividing the vehicle top into three or four roof parts, the first advantage according to the invention is achieved, according to which the length of the roof part assembly in the packing position is reduced. Furthermore, in the case of four small roof shells and the special kinematics, the third roof shell will pass below the fourth roof shell, and the roof is put away within the encasing volume permitted by the textile fabric of the top. Similarly, the use of three or four roof parts reduces the stressing at the bearing points of the individual roof parts, since the overall mass of the vehicle roof is divided over three or four roof parts instead of over two or three. Since, in the storage position of the top, the first roof part forms the uppermost part and the upper side thereof is also directed upward in the storage position, this orientation, in each case in conjunction with a top compartment lid, can form both protection against mechanical effects and also a visually attractive appearance of the front most roof part. By the generally linear shifting of the third surface element such that it passes below the fourth surface element accommodating the rear window, in the packing position the rear window is protected both on its upper side and on the lower side by surface elements against mechanical effects. If the roof structure according to the invention is realized with three surface elements, the first and second surface elements in this description are to be read as one, and consequently this surface element forms the roof lug and, in the closed position of the top, is disposed such that it follows the penultimate surface element which passes below it.

In an advantageous manner, the first surface element is shifted above the second surface element during the opening phase, and the two surface elements, together with the fourth element, enclose the second surface element between them in the form of a Z fold (parallel displacement). A very compact packing position of the top shells can therefore be achieved. Furthermore, with the four smaller roof shells and the kinematic combination of the Z fold with parallel displacement (the passing of the third roof shell under the fourth roof shell), the storage packet is minimized. All of the roof parts can therefore be put away one above another with the same convexity "in the manner of an onion skin".

In an advantageous embodiment with, for example, four surface elements, the third surface element is operatively connected in such a manner to a link supporting at least one of the surface elements that the third surface element undergoes a translatory movement. In an embodiment with a total of three surface elements, the third surface element is in operative connection with the link.

A further advantageous measure is to arrange in the region of the front edge and the rear edge of the third surface element downwardly protruding holding arms, of which the front holding arm is fastened in an articulated manner to a link supporting at least one surface element and of which the rear holding arm is mounted in a slotted guide mechanism disposed in the region of the fourth element. The shifting of the third surface element can therefore be realized in a simple manner, since the application of force for the displacement comes only from the link and the dead weight of the third roof shell, and the control of the direction of movement of the third surface element is realized via the slotted guide mechanism. By the relatively free mounting of the rear edge of the third surface element, possible error sources, in particular stresses, are avoided.

It has proven advantageous to support the first surface element by a roof link and the second surface element by a main link and to fasten the front holding arm of the third surface element to the roof link in an articulated manner. The provision of a roof link and of a main link makes it possible to shift the first and the second roof parts with respect to each other in the form of a parallel displacement and, during the entire process of storing the top, to ensure an upwardly directed orientation of the upper sides of the first and second roof shells. An advantage of this consistent orientation of the surfaces of the first and second surface elements is that the arrangement of a top section, which connects the first and the second surface elements, is made possible.

A further advantageous measure is to mount the roof link at the one end on the main bearing and at the opposite end on the first surface element and, at its region facing the first surface element, to connect it to the second surface element in an articulated manner. A four-bar kinematic configuration is therefore constructed and moves the second roof element.

Furthermore, it is proposed that, during the opening phase, the third surface element is guided in a movement generally parallel to the fourth element. The third surface element can therefore be brought into a packing position in a simple and space-saving manner. In an advantageous embodiment, during the opening phase, the third surface element passes through two movement phases, the movement in the first movement phase having a component which is directed downward from the roof plane and a further direction component directed parallel to the fourth element and, in the second movement phase, executes a generally linear movement directed parallel to the fourth element. This can be realized, for example, by a guide slot which is disposed in the region of or on the fourth surface element and has at least two sections a, b which enclose an obtuse angle with each other. Such a use of the control of the third roof element enables a reliable, purely mechanical positive control of the third surface element to be achieved.

Furthermore, it is proposed that, in the first movement phase of the opening movement, the fourth element can be moved upward at the rear by its front edge and, in the subsequent movement phase, the front edge can be lowered downward at the rear. Such a movement of the fourth element assists the movement of the third surface element in which it passes below the fourth element, accelerates the entire folding-in operation and enables the latter to take place in a smaller space.

In this connection, it is advantageous, in the shifting of the top into the packing position in a first movement phase, to allow the clamping hoop to execute a curved movement directed rearward and downward and, in a subsequent movement phase, to execute a generally linear, rearwardly directed movement. The effect achieved by this is that the fourth element that is operatively connected to the clamping hoop executes its erecting movement (front edge moves upward at the rear) in a simple manner.

The third surface element is advantageously not connected to the fabric of the top, and therefore the latter can be shifted into as compact a packing position as possible without taking a connection of the fabric of the top into consideration. The fabric of the top is connected to the first surface element at least partially in a sheet-like manner and to the second surface element at least linearly or at points. The sheet-like connection of the fabric of the top to the first surface element ensures, in the closed position of the top, during the shifting of the top and in the open position of the top, a textile top which acts upon the front most surface element uniformly and reliably such that the visual appearance is influenced positively in every position of the top. The linear or point-like connection of the fabric of the top to the second surface element has a positive influence on the handling of the fabric of the top during the shifting phase of the top, since the possibilities of an erroneous falling of the folds of the fabric of the top during the opening phase of the top are decisively reduced.

Other features which are considered as characteristic for the invention are set forth in the appended claims.

Although the invention is illustrated and described herein as embodied in a flexible vehicle roof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEW OF THE DRAWING

DETAILED DESCRIPTION OF THE INVENTION

Figure 1:
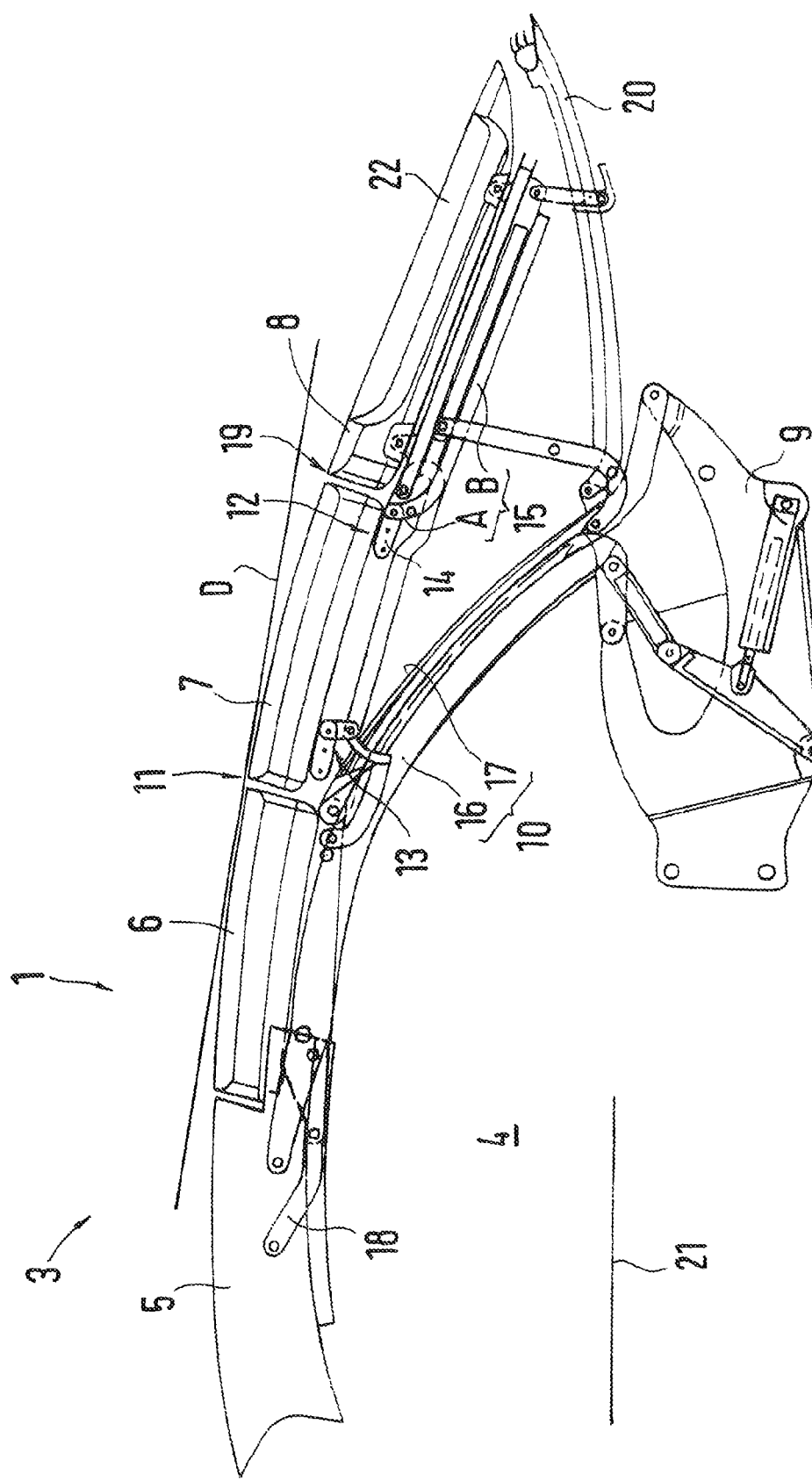
FIG. 1 is a diagrammatic, side view of a flexible vehicle roof in the closed position according to the invention.
Figure 2:
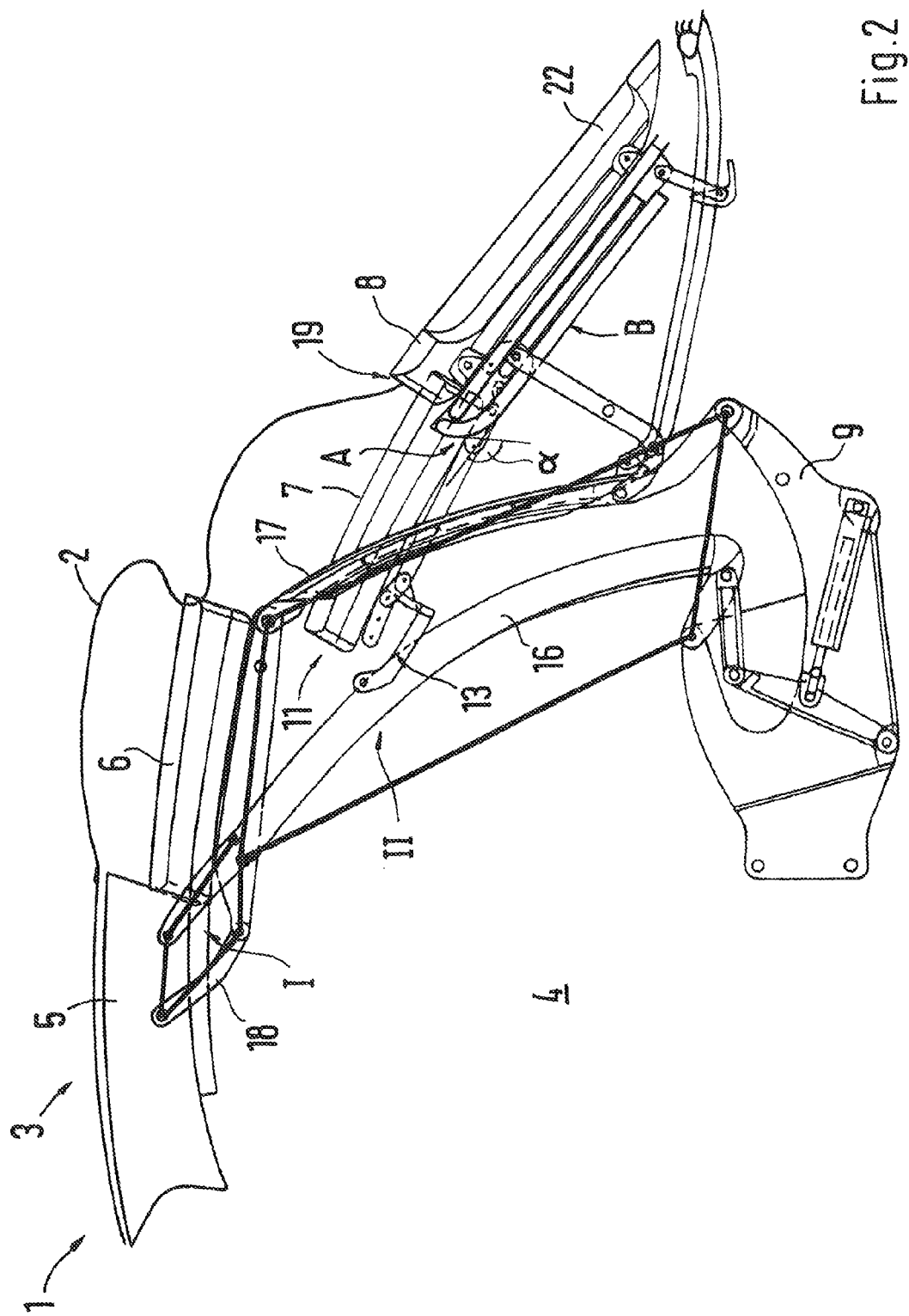
FIG. 2 is a diagrammatic, side view of the vehicle roof according to FIG. 1 in a first movement phase during an opening movement of the top.
Figure 3:
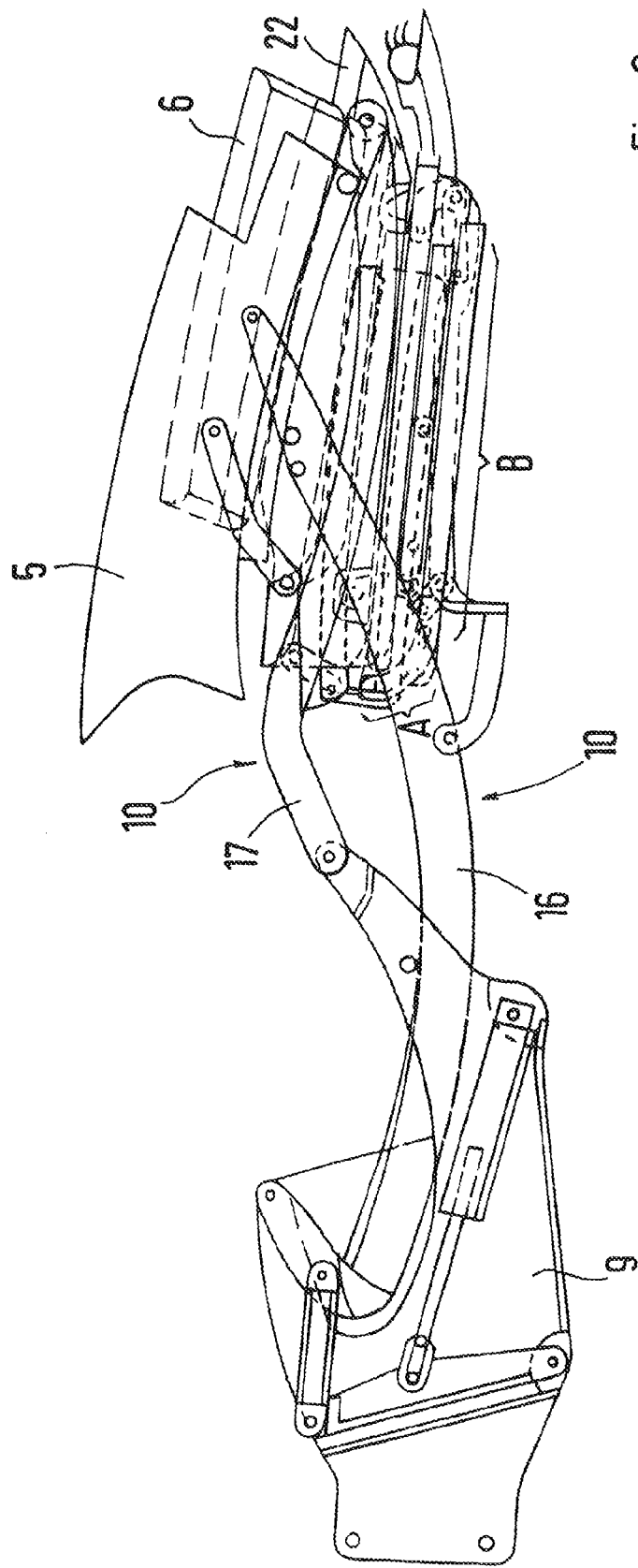
FIG. 3 is a diagrammatic, side view of the vehicle roof according to FIGS. 1-2 in the final opening position (packing position)
Figure 4:
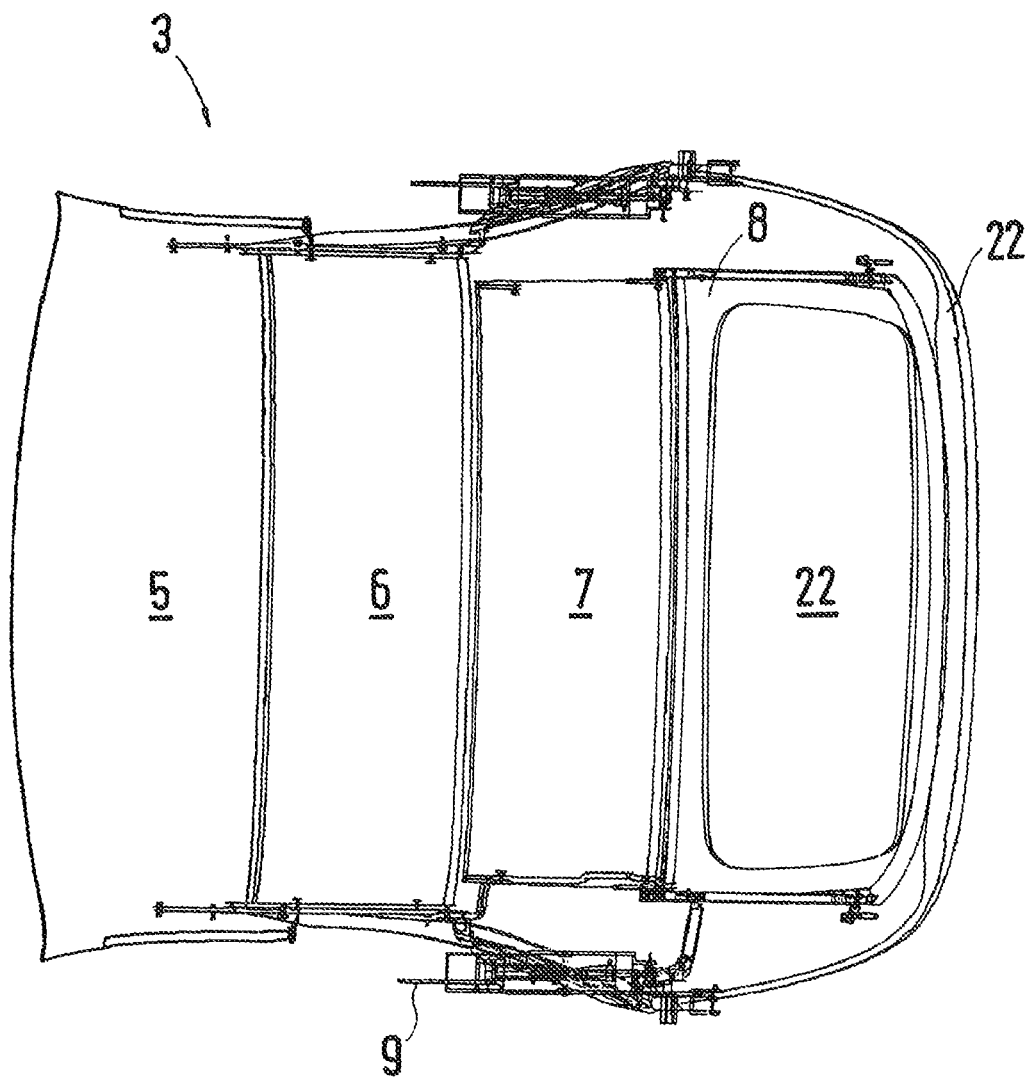
FIG. 4 is a diagrammatic, plan view of the flexible vehicle roof according to FIG. 1.

Referring now to the figures of the drawing in detail and first, particularly, to FIGS. 1-2 thereof, there is shown a flexible vehicle roof 1. The vehicle roof 1 has a flexible roof skin 2 and a plurality of supporting elements 3 that interact with the roof skin. The supporting elements 3 are configured at least partially in some regions as sheet-like surface elements 3 or shells supporting the roof skin 2 and can be shifted together with the roof skin 2 from a closed position into an open position opening up a vehicle interior 4. It being possible for a plurality of the surface elements 3 to be brought into overlap at least in some regions in the open position. In the open position, a first surface element 5 (roof lug) which, in the closed position, adjoins the frame which accommodates the windshield is disposed together with a second, adjoining surface element 6 above a fourth element 8 surrounding a rear window 22 (see FIG. 4), and, during the opening phase, a third surface element 7 which, in the closed position, is disposed between the second surface element 6 and the fourth surface element 8 is shifted in a positively coupled manner into a packing position located below the fourth element 8.

The construction and the arrangement of the articulated struts of a preferred embodiment of the flexible vehicle roof 1 according to the invention can best be seen in FIG. 2, in which the vehicle roof 1 is approximately half open. During the opening phase, the first surface element 5 is shifted over the second surface element 6. These two surface elements 5, 6 are shifted together with the fourth element 8 in a Z-like movement, with the surface elements 5, 6 forming an upper limb of the Z, links 10 connecting the surface elements 5, 6 to a main bearing 9 on the vehicle body forming a central limb of the Z, and the third and the fourth roof elements 7, 8 forming a lower limb of the Z.

Downwardly protruding holding arms 13, 14 are disposed in the region of a front edge 11 and a rear edge 12 of the third surface element 7. The holding arms 13, 14 do not absolutely have to be constructed as an integral component but rather, for example, can also be configured as multi-section link chains. The front holding arm 13 is fastened in an articulated manner to a link 10 supporting at least one surface element 5, 6, 7. The rear holding arm 14 is mounted both rotatably and in a linearly movable manner in a guide 15 with a slot, for example a guide groove, which is disposed in the region of the fourth element 8.

The construction and the configuration of the articulated struts of a preferred embodiment of the flexible vehicle roof 1 according to the invention can best be seen in drawing FIG. 2. In this case, the first surface element 5 is supported by a roof link 16 and the second surface element 6 by a main link 17. In the closed position of the top, the roof link 16 and the main link 17 take up a position engaging one in the other in some regions. The front holding arm 13 of the third surface element 7 is fastened to the roof link 16 in an articulated manner. The roof link 16 is mounted at one end on the main link 17 and at the opposite end on the first surface element 5 and, at its region facing the first surface element 5, is connected to the second surface element 6 in an articulated manner. The second surface element 6 is connected to the first surface element 5 via an upper section of the roof link 16 and by a coupling link 18. The coupling link 18 is articulated in a rotatable manner on a front, lower region of the second surface element 6 and, at its other end, on a lower central region of the first roof element 5. Consequently, the roof structure of the vehicle has two four-bar linkages I, II, the first four-bar linkage I being formed from regions of the first surface element 5, the second surface element 6, the upper region of the roof link 16, and the coupling link 18. The second four-bar linkage II is formed from the downwardly pointing region of the roof link 16, of a section of the second surface element 6, and from the link 17 and the mounting on the vehicle body of the rotation points of the roof link 16 and of the main link 17 which can be fastened, for example, in a main bearing 9. It is possible, via these two four-bar linkages I, II, firstly to engage over a relatively large passenger compartment by the surface elements 5, 6, 7 and at the same time to keep the forces acting on the main bearing 9 relatively low because of the dead weight of the top.

During the opening phase, the third surface element 7 is guided in a movement generally parallel to the fourth element 8, the force initiating the movement very largely arising from the movement of the roof link 16 and, in addition, the weight of the third roof element 7 being useful. The third surface element 7 passes through two movement phases during the opening phase, the movement in the first movement phase passing through a component directed downward from the roof plane D and a further directional component directed parallel to the fourth element 8 and, in the second movement phase, a generally linear movement directed parallel to the fourth element 8 being executed. In order to realize such a movement of the third surface element 7 in a simple manner, it is provided to configure the guide 15, which is disposed on the fourth roof element 8, with at least two sections A, B which enclose an obtuse angle α with each other. During the first movement phase of the opening movement, the fourth element 8 is shifted upward at the rear by its front edge 19 and, in the subsequent movement phase, the front edge 19 is lowered downward at the rear. This erecting movement of the fourth element 8 in the first phase of the opening movement of the vehicle roof 1 assists the positively controlled sequence of movement of the third surface element 7, the movement of which is determined by the roof link 16 and the guide 15 which is slotted.

The stressing of the roof skin 2 is released by the first surface element 5 being shifted rearward and upward. A clamping hoop 20 is also connected to the roof skin 2. In the closed position of the top, the clamping hoop 20 is disposed below the fourth roof element 8 generally level with a breast line 21 and, in a first movement phase of the opening movement, is moved by the releasing of the stressing of the roof skin 2 rearward and downward in the form of a curved movement and subsequently, after reaching the vertical final position (impinging on the floor of the top compartment), executes a generally linear, rearwardly directed movement.

The fabric 2 of the top is connected to the first surface element 5 at least in a partially sheet-like manner and to the second surface element 6 linearly or at points. Furthermore, the roof skin 2 is connected to the front edge 19 of the fourth element 8 and engages around the rear window 22 in a known manner. For the positive kinematics of the third surface element 7, it is crucial that the roof skin 2 is not connected fixedly to the third surface element 7. The third surface element 7 only acts upon the roof skin 2 in the closed position of the top and exerts a supporting function. With the exception of the surface elements, the fourth element 8, the rear window 22 and the clamping hoop 20, all of the elements described hitherto are disposed symmetrically on both longitudinal sides of the vehicle, but can only be seen once in the side view.

The drive unit for the vehicle roof 1 is not illustrated specifically in detail and can act in a conventional manner, for example on the main link 17 of the vehicle roof 1.

In the exemplary embodiment illustrated, the movement of the clamping hoop 20 is substantially influenced by the rear region of the flexible roof skin 2, which is fastened linearly to the clamping hoop 20. However, it is also possible to more precisely define the movement of the clamping hoop 20 during the opening and closing phase by use of coupling levers between the fourth roof element 8 and the clamping hoop 20.

The invention claimed is:

1. A flexible vehicle roof, comprising:
   a flexible roof skin;
   a linkage; and
   a plurality of supporting elements interacting with and supporting said flexible roof skin, said supporting elements configured at least partially in some regions as sheet-like surface elements, said supporting elements being shifted together with said flexible roof skin from a closed position into an open position opening up a vehicle interior, it being possible for a plurality of said sheet-like surface elements to be brought into overlap at least in some regions, said supporting elements including a front surface element forming a roof lug, a rear element surrounding a rear window, and an intermediate surface element, in the open position, said front surface element being disposed above said rear element, and said intermediate surface element which, in the closed position, is disposed between said front surface element and said rear element, is displaced, via said linkage, during an opening phase in a positively coupled manner into a packing position disposed below said rear element.

2. The flexible vehicle roof according to claim 1, wherein said plurality of supporting elements is four supporting elements configured at least partially as said sheet-like surface elements, said sheet-like surface elements including said front surface element being a first surface element, a second surface element adjoining said first surface element, said intermediate surface element being a third surface element and said rear element being a fourth surface element and, in the open position, said first surface element is disposed together with said second surface element above said fourth surface element.

3. The flexible vehicle roof according to claim 2, wherein during the opening phase, said first surface element is shifted above said second surface element and, together with said fourth surface element, encloses said second surface element in a Z folding-in movement.

4. The flexible vehicle roof according to claim 2, further comprising a link supporting at least one of said sheet-like surface elements, said third surface element is in operative connection with said link, said operative connection triggering a translatory movement.

5. The flexible vehicle roof according to claim 4, wherein said third surface element has a front edge and a rear edge, and further comprising:
   downwardly protruding holding arms disposed in a region of said front edge and said rear edge of said third surface element;
   said downwardly protruding holding arms including a front holding arm fastened to said link in an articulated manner and a rear holding arm movably mounted to said fourth surface element.

6. The flexible vehicle roof according to claim 5, wherein said link includes:
   a roof link supporting said first surface element, said front holding arm fastened to said third surface element further fastened to said roof link in an articulated manner; and
   a main link supporting said second surface element.

7. The flexible vehicle roof according to claim 6, further comprising a main bearing, said roof link having a first end mounted on said main bearing and a second end, opposite said first end, mounted on said first surface element and, said roof link at a region facing said first surface element, is connected to said second surface element in an articulated manner.

8. The flexible vehicle roof according to claim 5, further comprising a guide disposed on said fourth surface element, said guide including at least two sections which enclose an obtuse angle with each other.

9. The flexible vehicle roof according to claim 2, wherein in a first movement phase of the opening phase, said fourth surface element can be moved upward at a rear by its front edge and, in a subsequent movement phase, said front edge can be lowered downward at said rear.

10. The flexible vehicle roof according to claim 1, further comprising a clamping hoop connected to said flexible roof skin.

11. The flexible vehicle roof according to claim 2, wherein said third surface element is not connected to said flexible roof skin.

12. The flexible vehicle roof according to claim 2, wherein said flexible roof skin is connected to said first surface element at least partially in a sheet-like manner and to said second surface element linearly or at points in some regions.

* * * * *